US012567133B2

(12) United States Patent　　　(10) Patent No.:　US 12,567,133 B2
Yu et al.　　　(45) Date of Patent:　Mar. 3, 2026

(54) AUDIOVISUAL SYSTEM WITH SHARED IMAGE-PROCESSING PROCEDURE AND METHOD FOR PROCESSING VIDEO THEREIN

(71) Applicant: REALTEK SEMICONDUCTOR CORP., Hsinchu (TW)

(72) Inventors: Chia-Wei Yu, Hsinchu (TW); Hsin-Ying Ou, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 87 days.

(21) Appl. No.: 18/513,729

(22) Filed: Nov. 20, 2023

(65) Prior Publication Data

US 2024/0169507 A1　　May 23, 2024

(30) Foreign Application Priority Data

Nov. 21, 2022　(TW) .................................. 111144343

(51) Int. Cl.
*G06T 5/92*　　　(2024.01)
*H04N 7/01*　　　(2006.01)
*H04N 9/67*　　　(2023.01)

(52) U.S. Cl.
CPC ................. *G06T 5/92* (2024.01); *H04N 7/01* (2013.01); *H04N 9/67* (2013.01); *G06T 2207/10016* (2013.01); *G06T 2207/20208* (2013.01)

(58) Field of Classification Search
CPC ............. G06T 5/92; G06T 2207/10016; G06T 2207/20208; H04N 7/01; H04N 9/67; H04N 5/202
See application file for complete search history.

(56) References Cited

U.S. PATENT DOCUMENTS

| | | | |
|---|---|---|---|
| 10,104,306 B2 | 10/2018 | Chen et al. | |
| 2010/0091183 A1* | 4/2010 | Hatasawa ................ | H04N 9/64 |
| | | | 348/E7.003 |
| 2017/0256039 A1* | 9/2017 | Hsu ........................... | G06T 5/92 |

(Continued)

FOREIGN PATENT DOCUMENTS

| | | |
|---|---|---|
| CN | 115190313 A | 10/2022 |
| TW | 201807561 A | 3/2018 |

*Primary Examiner* — Michael Lee

(74) *Attorney, Agent, or Firm* — Li & Cai Intellectual Property (USA) Office

(57)　　　　ABSTRACT

An audiovisual system with a shared image-processing procedure and a method for processing video therein are provided. The audiovisual system performs the image-processing procedure on a specific format video for optimizing images of the video. If a video format is not supported by the image-processing procedure in the audiovisual system, the video is converted to a video format supported by the audiovisual system. Various videos of different formats can accordingly share the same image-processing procedure. In the method, a first format conversion procedure is performed for converting a received second format video to a first format video that is supported by the image-processing procedure performed in the audiovisual system. The first format video can then be processed by the audiovisual system. It is determined if one more format conversion is required according to the format supported by a display at an output end of the audiovisual system.

14 Claims, 9 Drawing Sheets

(56)                    References Cited

U.S. PATENT DOCUMENTS

| | | | | |
|---|---|---|---|---|
| 2017/0257597 A1* | 9/2017 | Into | .......................... | H04N 5/265 |
| 2018/0063404 A1* | 3/2018 | Chen | ....................... | H04N 23/69 |
| 2018/0278808 A1* | 9/2018 | Hsu | ....................... | H04N 1/6061 |
| 2019/0191124 A1* | 6/2019 | Peng | .......................... | G06T 5/90 |
| 2021/0092342 A1* | 3/2021 | Yuan | ....................... | H04N 23/86 |

* cited by examiner

AUDIOVISUAL SYSTEM WITH SHARED IMAGE-PROCESSING PROCEDURE AND METHOD FOR PROCESSING VIDEO THEREIN

CROSS-REFERENCE TO RELATED PATENT APPLICATION

This application claims the benefit of priority to Taiwan Patent Application No. 111144343, filed on Nov. 21, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology for processing a video, and more particularly to an audiovisual system providing a shared image-processing procedure with respect to different formats of videos and a method for processing the video, including conversion of video formats.

BACKGROUND OF THE DISCLOSURE

A conventional image-processing device performs a corresponding image-processing procedure on an input image according to a format of the image. An input video can be a high dynamic range (HDR) video or a standard dynamic range (SDR) video. The conventional image-processing device provides corresponding analysis and image-processing procedures for different formats of the videos.

Reference is made to FIG. 1, which is a schematic diagram depicting a conventional video processing technology. A video 10 that can be an HDR video or an SDR video is inputted to a processing circuit, in which the HDR video and the SDR video have different characteristics in aspects of brightness and color gamut and have different encodings. Generally, when compared to an SDR image, an HDR image provides a richer color range for presenting more details of the image. Therefore, two different image-processing procedures that particularly require different image-processing parameters are provided for the two types of videos, respectively.

FIG. 1 is a diagram depicting a circuit or a flow for processing a video with a specific format. The circuit or the flow cannot be applied to both the HDR video and the SDR video at the same time. When a video 10 is inputted to a video processing circuit, an analyzer 100 is used to analyze image features of the video in a statistical manner. For example, the analyzer 100 can first obtain high frequency and low frequency components of the images, a distribution of statistical brightness, and saturation and hue of the images. Afterwards, a first image-processing unit 101 and a second image-processing unit 102 are respectively used in conjunction with different parameters to perform image processing, e.g., noise reduction process and sharpness process.

In the conventional technology, the videos in different formats require various parameters for processing the images individually. That is, different parameters are required in the circuit for processing the images of the HDR video and the SDR video. Therefore, two sets of the circuit or the flow for processing the video of FIG. 1 need be provided.

SUMMARY OF THE DISCLOSURE

In response to the above-referenced technical inadequacy, the present disclosure provides an audiovisual system with a shared image-processing procedure for videos in different formats and a method for processing the video. The shared image-processing procedure does not require the audiovisual system to provide any additional corresponding procedure for the videos in the formats that are not supported by the audiovisual system.

According to one embodiment of the present disclosure, the audiovisual system with the shared image-processing procedure performs the method for processing a video. Firstly, the audiovisual system receives a second format video from an audiovisual source, and the second format video can be an HDR video that is with a format that is different from a format of a first format video (e.g., an SDR video) supported by an image-processing procedure executed in the audiovisual system. Then, a first format conversion procedure is required to be performed to convert the second format video into the first format video supported by the image-processing procedure in the audiovisual system. Therefore, the image-processing procedure can process the first format video and output a first format video that has been processed.

Furthermore, processing parameters that are applied to the image-processing procedure executed in the audiovisual system are configured to be modulated for the first format video so as to optimize the video outputted to a terminal display device. After the first format video has been processed, if a terminal display device connected with an output end of the audiovisual system supports the second format video, a second format conversion procedure may be further required. The second format conversion procedure is required to produce the second format video to output to the terminal display device.

Moreover, in the first format conversion procedure, a frame-by-frame conversion is performed on the received second format video that is converted from a first color space to a second color space. Next, an electro-optical transfer procedure is performed on the video in the second color space for converting digital video signals into visible light signals. Afterwards, a video format conversion is performed for converting the second format video in the second color space into the first format video. An optical-electro transfer procedure is then performed on the first format video for gamma correction. Finally, the first format video that undergoes the gamma correction is frame-by-frame converted from the second color space to the first color space, and then outputted to the image-processing procedure executed in the audiovisual system for further processing.

In addition, the image-processing procedure for image optimization is performed in the audiovisual system for statistically analyzing image features of the first format video and then performing one or more image-processing processes on the first format video. The image-processing processes can be one or more processes including noise reduction, image sharpening, saturation adjustment, and contrast and hue adjustment.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
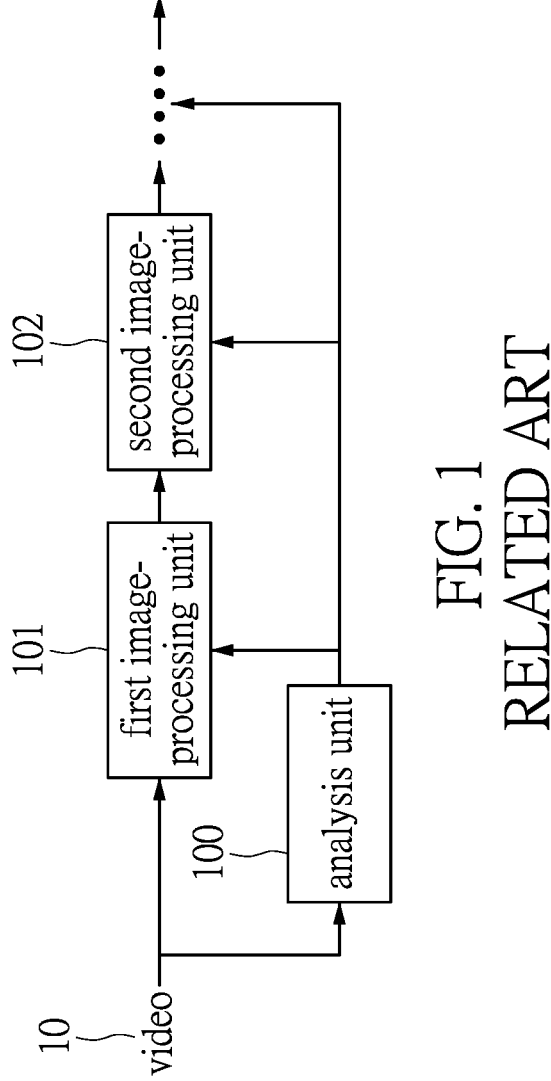
FIG. 1 is a schematic diagram of a conventional video processing technology.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In view of the fact that the conventional technologies generally need to provide the corresponding circuits or procedures to process the videos in different formats, the present disclosure provides an audiovisual system with a shared image-processing procedure and a method for processing a video. The audiovisual system is a circuit system, a system, or a device that is used in collaboration with software and hardware configured to process the video and output the video in a specific format. In the method for processing a video, the video is converted in an earlier stage for allowing the image-processing procedure in collaboration with software and/or hardware to be adapted to videos of various video formats such as high dynamic range (HDR) videos and standard dynamic range (SDR) videos. A practical product of the audiovisual system can be a system-on-chip (SoC), an embedded television system, or software or circuits in any image-processing device. The image-processing device implemented by the audiovisual system can be built in a display device such as a television or an external display device.

The image-processing procedure performed in the audiovisual system adopts various image-processing parameters that can be modulated to support a specific format of the video. For example, the image-processing parameters used for an SDR video may not be adaptable to an HDR video. Through format conversions in the audiovisual system, the image-processing procedure can be adapted to the HDR video so as to achieve sharing of the image-processing procedure.

Figure 2:
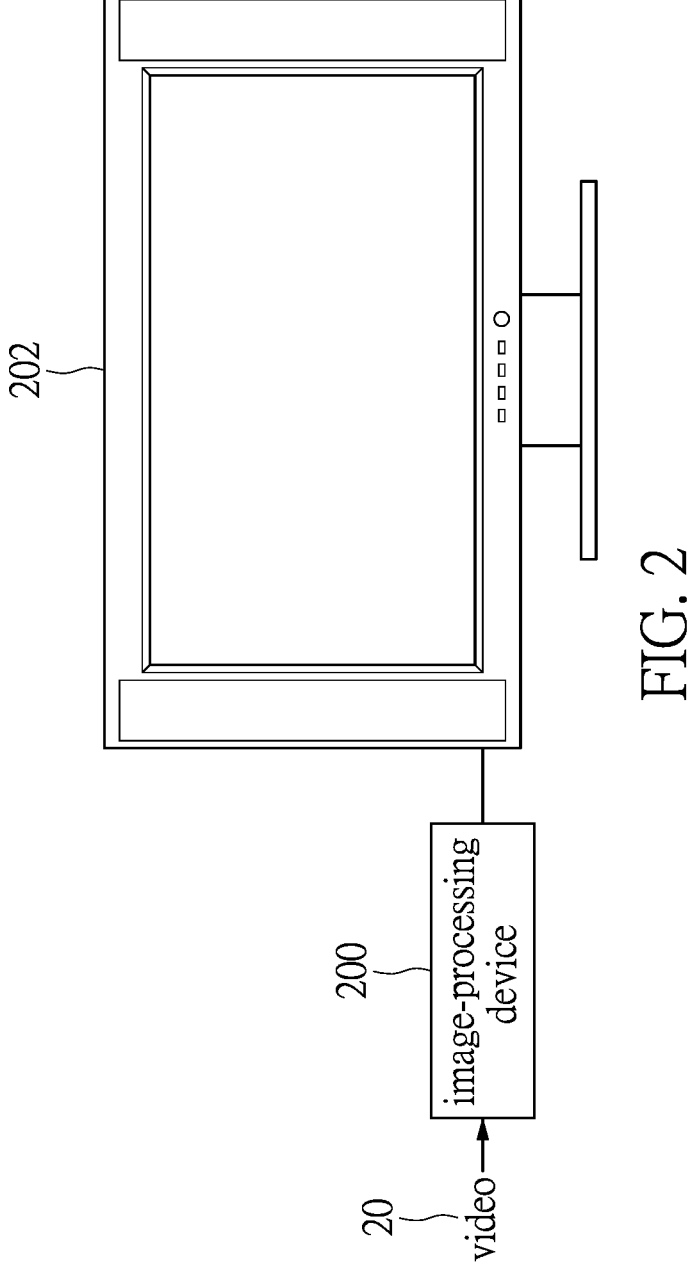
FIG. 2 is a schematic diagram illustrating one of the applications of an audiovisual system according to one embodiment of the present disclosure.

Reference is made to FIG. 2, which is a schematic diagram illustrating one of the applications of the audiovisual system according to one embodiment of the present disclosure. The audiovisual system can be disposed inside an image-processing device 200. The audiovisual system provides various shared image-processing procedures for videos. An output end of the audiovisual system is connected with a terminal display device 202 that can be a television or a display. The terminal display device 202 can be used to display an HDR video or an SDR video that is supported by the terminal display device 202. The terminal display device 202 can be externally connected with the image-processing device 200. The image-processing device 200 includes an audiovisual system with various shared image-processing procedures. The audiovisual system can also be built in the terminal display device 202, and the audiovisual system performs the method for processing a video 20 when the image-processing device 200 receives the video 20. If the image-processing procedure operating in the audiovisual system does not support the format of the video 20, the video 20 can be converted to a video format that is supported by the image-processing procedure without the need to process a video in a video format that is not supported. Afterwards, if necessary, the video can be converted to the video format supported by the terminal display device 202.

Figure 3:
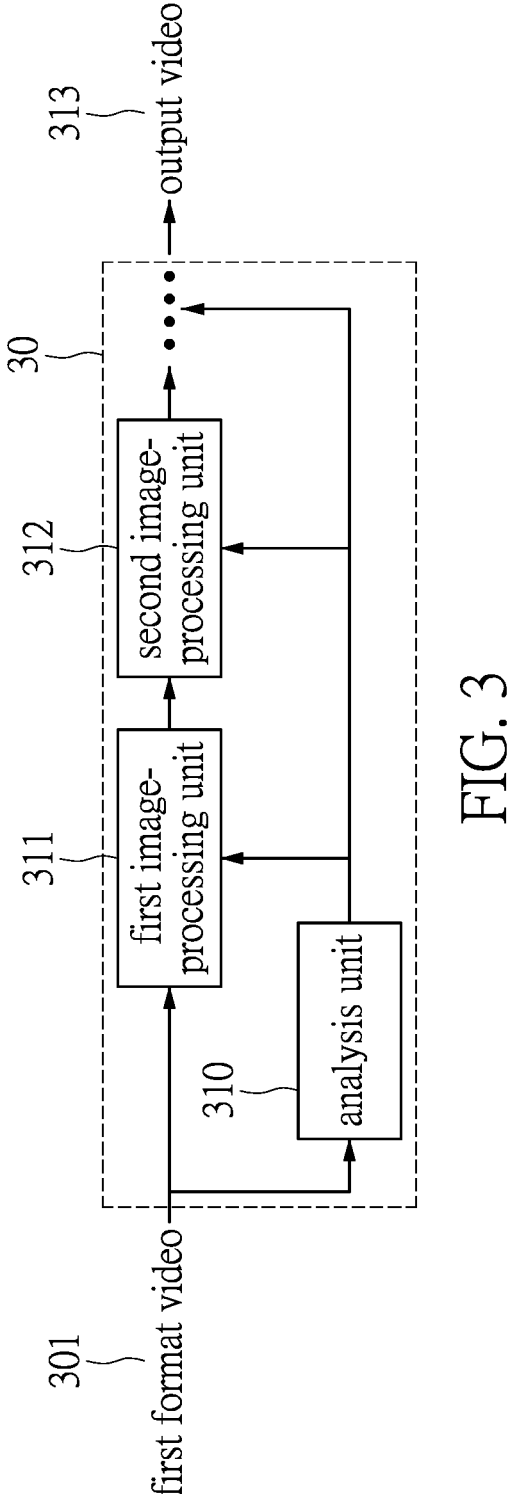
FIG. 3 is a schematic diagram illustrating an image-processing unit of the audiovisual system according to one embodiment of the present disclosure.

Reference is then made to FIG. 3, which is a schematic diagram illustrating an image-processing unit of the audiovisual system according to one embodiment of the present disclosure. An image-processing unit 30 is provided for processing an image portion of the video, another processing unit can be provided for processing an audio portion of the video, and is not iterated herein.

The audiovisual system provides various image-processing tools for optimizing the video. For example, the image-processing unit 30 receives a first format video 301. The parameters used to process the first format video 301 have been preconfigured during the development of the audiovisual system. The image processing tools that can be adopted in a first image-processing unit 311 and a second image-processing unit 312 are used to perform one or more image-processing procedures such as, but not limited to, noise-reduction, image sharpening, saturation adjustment, contrast adjustment and hue adjustment.

When the audiovisual system is in operation, the image-processing unit 30 receives the first format video 301 and an analysis unit 310 statistically analyzes image features of the first format video 301. The image features relate to the features in various terms of the image-processing tools of the image-processing unit 30, and the image features are such as the portions of high and low frequencies of an image, brightness distribution, image saturation, color expression and hue. After the image features are provided to the first image-processing unit 311 and second image-processing unit 312, a video 313 supported by the terminal display device is outputted.

Figures 4, 5:
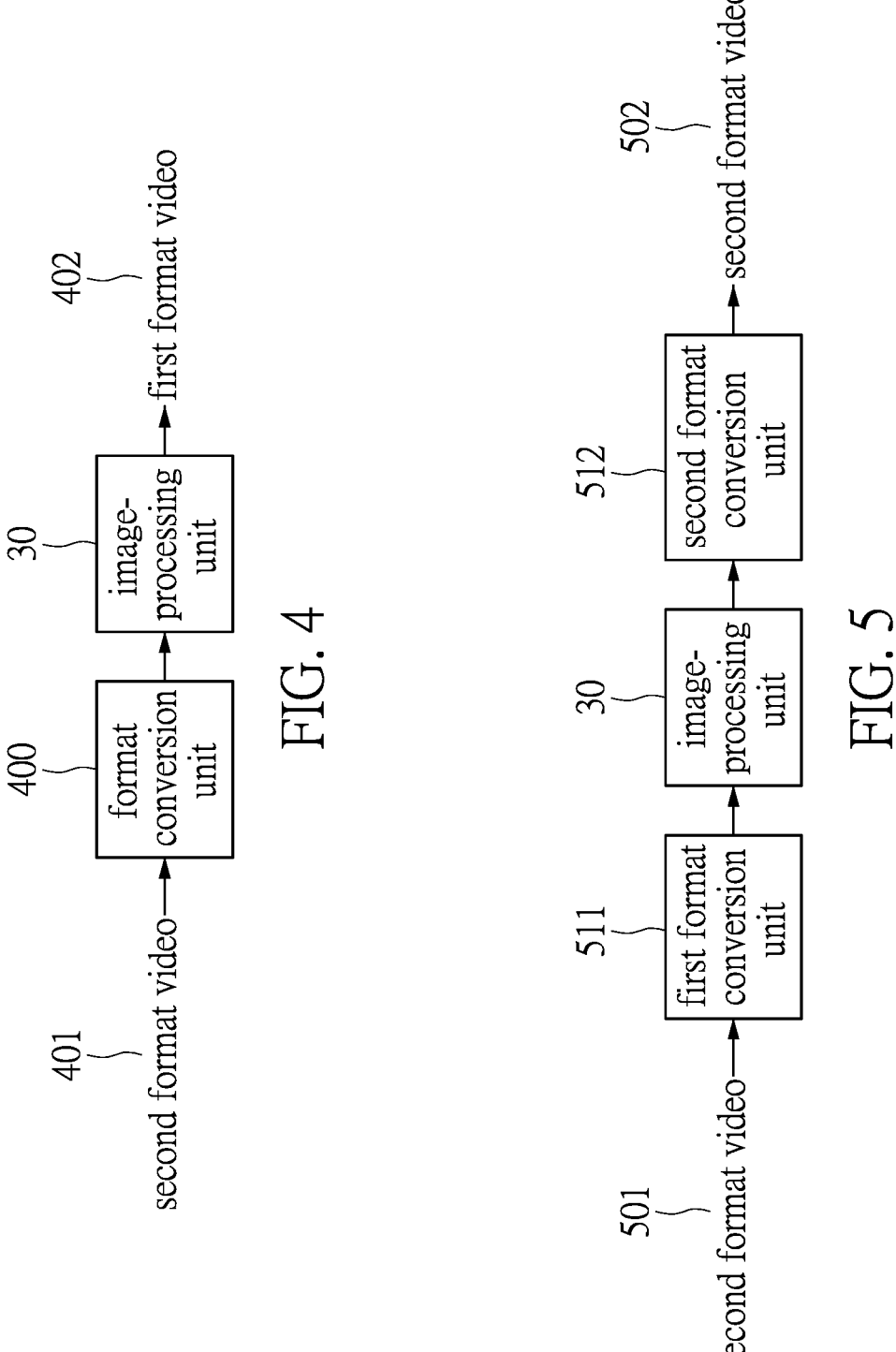
FIG. 4 is a schematic diagram illustrating the audiovisual system according to one embodiment of the present disclosure.
FIG. 5 is another schematic diagram illustrating the audiovisual system according to one embodiment of the present disclosure.

The applications of the audiovisual system implemented by the above-described image-processing unit 30 can be referred to in the schematic diagrams of the embodiments illustrated in FIG. 4 and FIG. 5. Since the image-processing unit 30 is configured to modulate the parameters being specified to only one format of the video, the audiovisual system determines, based on the format of an input video, whether or not to perform the format conversion that allows the image-processing tools of the audiovisual system to be applied to multiple video formats.

The audiovisual system can be implemented by a collaboration of a processor, a memory, and image processing software or firmware. The audiovisual system includes an image-processing unit 30 that is one of the image-processing tools for processing a video in a specific format, i.e., the first format video. The image-processing unit 30 uses the processing parameters to enhance the first format video. When a second format video 401 with a video format that is different from that of the first format video is received, a format conversion unit 400 is used to convert the second format video 401 into a video in a first format, and then the image-processing unit 30 is used to process the video. If a terminal display device connected to the audiovisual system supports the first format video, a first format video 402 that is processed can be directly outputted.

According to one embodiment of the present disclosure, before the audiovisual system processes the video by using the image-processing unit 30, an analysis means such as the analysis unit 310 of FIG. 3 is configured to extract the image features of the second format video 401 in a statistical manner. The image features are such as the information of color and hue of a plurality of frames of the video. Afterwards, the image-processing unit 30 can perform one or more image-processing processes on the video with respect to the image features, and then outputs the first format video 402.

For example, the image-processing unit 30 is a circuit or software that is used to process the SDR video (i.e., the first format video). When the audiovisual system receives an HDR video (i.e., the second format video), the format conversion unit 400 is required to convert the HDR video into an SDR video for facilitating operation of the image-processing unit 30 so as to achieve a shared image-processing procedure. The processed SDR video (i.e., the first format video) is then outputted. Likewise, in another example, when the image-processing unit 30 supports the HDR video and the inputted video is the SDR video, the format conversion unit 400 converts the SDR video into an HDR video. Then, according to the format supported by the terminal display device, it is determined whether or not to perform one more format conversion.

According to one further embodiment of the present disclosure, if the terminal display device connected to the audiovisual system supports the second format video, the video that has undergone the abovementioned image-processing procedure needs to undergo one further format conversion. Reference is made to FIG. 5, in which the audiovisual system firstly receives a second format video 501, and then analyzes image features of the second format video 501. A first format conversion unit 511 converts the second format video 501 to a first format video that is adapted to the image-processing unit 30. The image-processing unit 30 then performs image-processing on the first format video with respect to the image features. This processed first format video may be further converted to a second format video 502 by a second format conversion unit 512 since the terminal display device supports the second format video.

For example, the processing parameters applied to the image-processing unit 30 of the audiovisual system can be specifically modulated for SDR videos. Accordingly, if the input video is an HDR video, the first format conversion unit 511 is required to convert the HDR video to an SDR video. After format conversion, a second format conversion procedure may be performed to convert the SDR video to a video format (e.g., HDR) supported by a terminal display device at an output end of the audiovisual system; that is, the second format conversion unit 512 is used to convert the SDR video to the HDR video.

Thus, according to one embodiment of the method for processing a video of the present disclosure, it is determined whether or not to perform format conversion according to the format of the input video. An image-processing circuitry implementing the method can be adapted to various video formats. An input video is converted by means of circuits, software or firmware. The circuits, the software or a collaboration of the circuits and the software for detecting and converting the video collectively embody the audiovisual system.

Figures 6, 7:
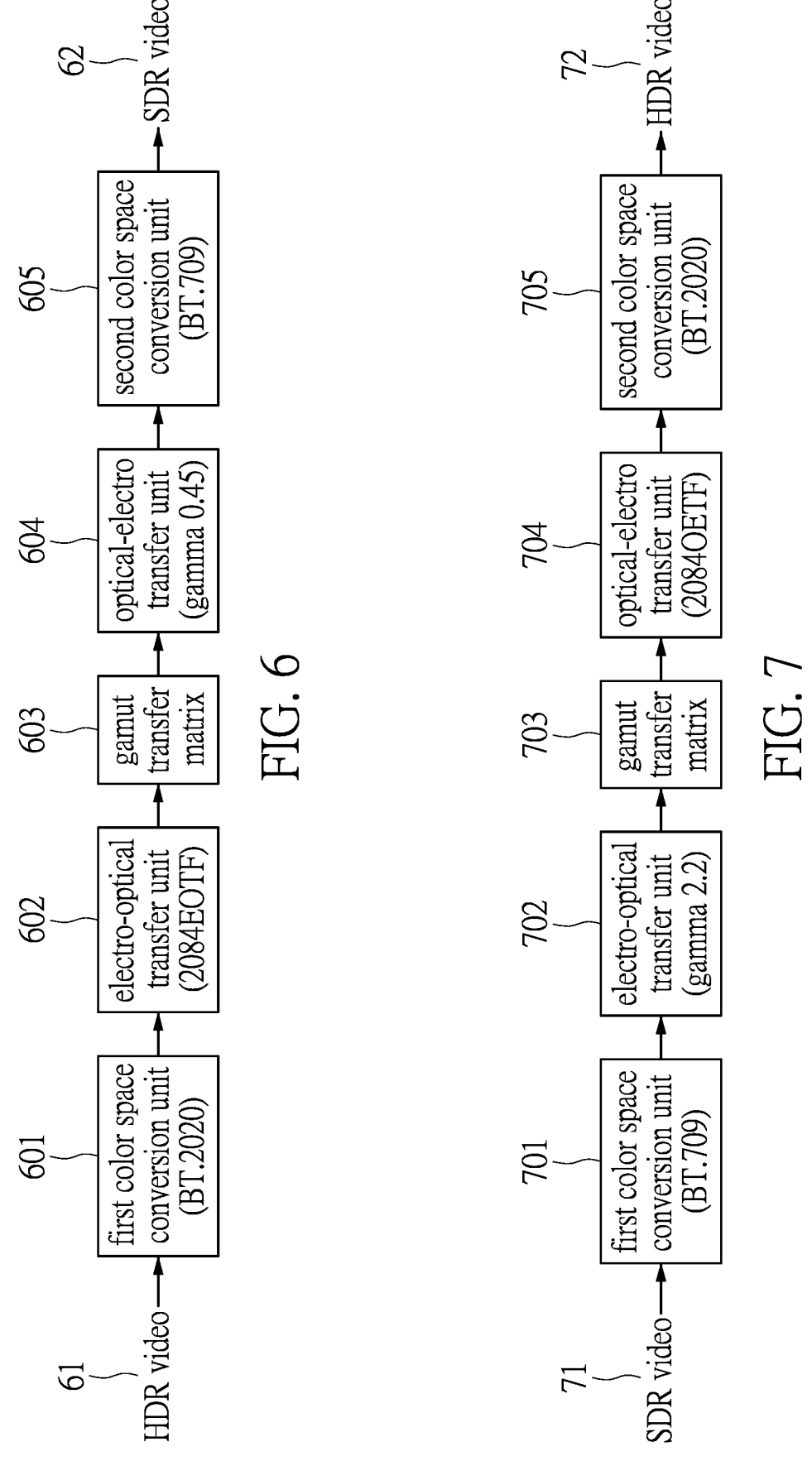
FIG. 6 is a schematic diagram illustrating various units in the audiovisual system in different stages of video format conversion according to one embodiment of the present disclosure.
FIG. 7 is another schematic diagram illustrating various units in the audiovisual system at different stages of video format conversion according to one embodiment of the present disclosure.

FIG. 6 is a schematic diagram depicting various units in the audiovisual system in different stages of video format conversion according to one embodiment of the present disclosure. The diagram exemplarily shows a process for converting an HDR video 61 to an SDR video 62. The various units in the different stages of video format conversion can be implemented by the circuits, software, or firmware. For example, the various units include a first color space conversion unit 601, a gamut conversion matrix 603 and a second color space conversion unit 605 for processing the color portion of the video; and an electro-optical transfer unit 602 and an optical-electro transfer unit 604 for processing the brightness portion of the video.

Figure 8:
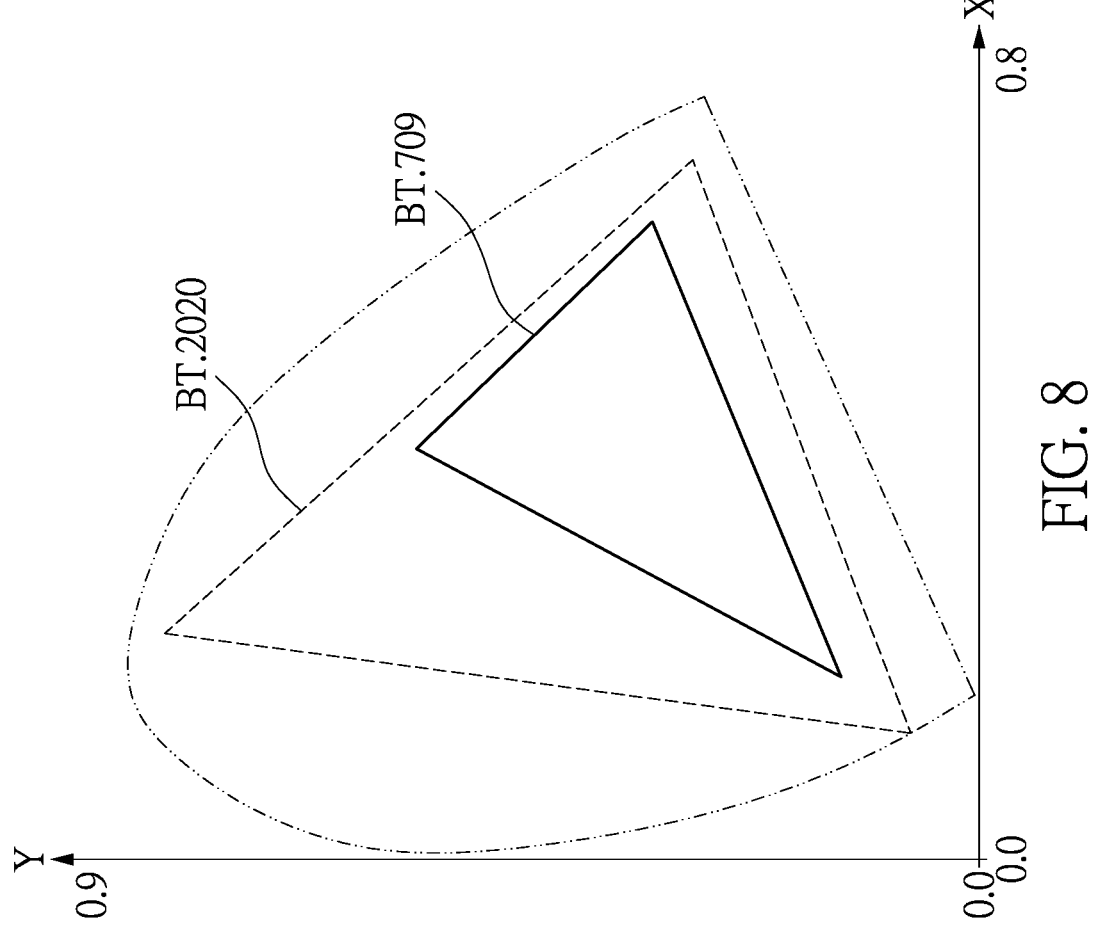
FIG. 8 is a schematic diagram illustrating different color gamut widths.

In an exemplary example, the images of an input video are in a color space with an encoded YUV (or YCrCb) system, in which "Y" represents grayscale or luminance and "UV" generally represents chrominance. It should be noted that a YUV-coded video is suitable for transmission, and the YUV-coded video should be converted to an RGB-coded video that is generally used for display. The RGB-coded video can also be in compliance with a super high resolution ITU BT.2020 video specification that has a wide color gamut. The ITU BT.2020 video specification at least defines a resolution, a frame rate, a bit depth, and a color presentation. Reference is made to FIG. 8, which is a schematic diagram showing several color gamut domains that have different widths, in which the coverage with respect to the ITU BT.2020 and BT.709 video specifications are shown.

Firstly, the audiovisual system receives a second format video from an audiovisual source. The audiovisual source can be an audiovisual streaming platform or an external electronic device. The audiovisual source provides a video in a specific format, for example, an HDR video 61. The HDR video 61 can be encoded in a specific format of a color space for ease of transmission. For example, the HDR video 61 can be encoded with the YUV color space, in which in which "Y" represents luminance, "U" and "V" represent chrominance.

In the process of this example, the first color space conversion unit 601 performs color space conversion for frame-by-frame converting the HDR video 61 from a first color space (e.g., the YUV color space) to a second color space (e.g., the RGB color space). One of the conversion procedures can be implemented by, but not limited to, a first conversion formula as shown below. In the first conversion formula, "[R,G,B]" respectively represents values of a red channel, a green channel, and a blue channel in the RGB color space, "[Y,U, V]" represent the values of components of the YUV color space, and "M1" represents a transfer matrix.

The first conversion formula is as follows:

$$[R, G, B]^T = M1[Y, U, V]^T;$$

$$\text{wherein, } M1 = \begin{bmatrix} 1 & 0 & 1.4746 \\ 1 & -0.1646 & -0.5714 \\ 1 & 1.8814 & 0 \end{bmatrix}.$$

Figure 9:
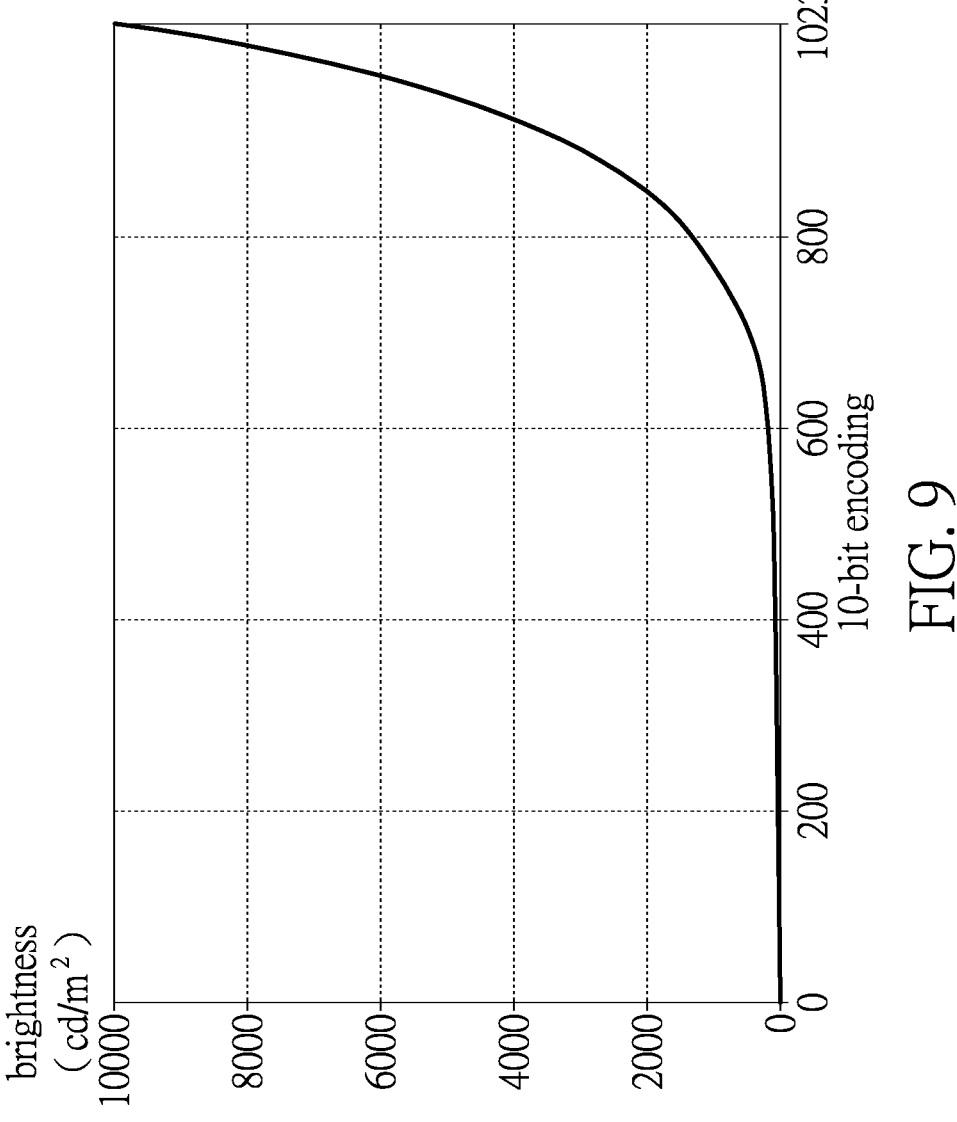
FIG. 9 is a schematic diagram illustrating a perceptual quantization curve adopted in an electro-optical transfer function according to one embodiment of the present disclosure.

The video being converted to the second color space (i.e., the RGB color space in the present example) can then be processed by an electro-optical transfer unit 602 for transferring the digital video data into visible light signals that are used for displaying. It should be noted that the electro-optical transfer unit 602 can be implemented by applying an electro-optical transfer function (EOTF), preferably 2084 EOTF. The electro-optical transfer procedure applying the electro-optical transfer function adopts a perceptual quantization (PQ) curve as shown in FIG. 9. Through the perceptual quantization curve, the digital signals for different channels (i.e., a red (R) channel, a green (G) channel, and a blue (B) channel) are quantized to 10-bit coding data. Every quantized value corresponding to the data transferred from the digital signals by referring to the perceptual quantization curve is a brightness range that is based on characteristics of the human eyes. In other words, the perceptual quantization curve is referred to for mapping the digital signals to the brightness values of the red, green and blue channels. The present example shows that the maximum brightness is 10000 nits (cd/m$^2$).

Afterwards, a gamut conversion matrix 603 is referred to for performing color gamut conversion so as to convert an HDR video in the second color space to an SDR video. For example, an ITU BT.2020 video with a wider color gamut is converted to an ITU BT.709 video with a narrower color gamut that can correspond to a high-resolution SDR video. A 3×3 transfer matrix shown below is used to map the BT.2020 color gamut to the BT.709 color gamut. An example of the color gamut conversion formula and a transfer matrix are shown as follows:

$$\begin{bmatrix} E_R \\ E_G \\ E_B \end{bmatrix}_{709} = \begin{bmatrix} 1.6605 & -0.5876 & -0.0728 \\ -0.1246 & 1.1329 & -0.0083 \\ -0.0182 & -0.1006 & 1.1187 \end{bmatrix} \begin{bmatrix} E_R \\ E_G \\ E_B \end{bmatrix}_{2020}.$$

After the video is converted to a high-resolution video under BT.709 specification, the high-resolution video is then processed by the optical-electro transfer unit 604 that adopts an optical-electro transfer function (OETF) with gamma 0.45 and is used to perform an optical-electro transfer procedure. It should be noted that, because the human eyes are more sensitive to the details of a dark region, the data of the color channels of the video in the second color space (i.e., an RGB color space) is processed by the optical-electro transfer procedure and undergoes gamma correction so that the brightness of the video under BT.709 specification approaches a gamma 0.45 curve that is more suitable for the human eyes.

Afterwards, the video can again be processed by the second color space conversion unit 605 for frame-by-frame converting the video undergoing gamma correction from the second color space (i.e., an RGB color space) back to the first color space (i.e., a YUV color space). In the present example, as compared with the conversion from the YUV color space to the RGB color space, one further conversion procedure can be implemented by, but not limited to, a second conversion formula. According to the second conversion formula, "[R,G,B]" represents the values of a red channel, a green channel, and a blue channel in the RGB color space, "[Y,U,V]" represents the values of the components of the YUV color space, and "M2" represents a transfer matrix.

The second conversion formula is as follows:

$$[Y, U, V]^T = M2[R, G, B]^T;$$

$$\text{wherein, } M2 = \begin{bmatrix} 0.2126 & 0.7152 & 0.0722 \\ -0.1146 & -0.3854 & 0.5 \\ 0.5 & -0.4542 & -0.0458 \end{bmatrix}.$$

Finally, the HDR video 61 is converted to the SDR video 62 under the BT.709 specification through the above conversion procedure. Accordingly, the audiovisual system achieves format conversion and then outputs the video to an image-processing procedure for image processing.

According to an aspect of the method for processing a video of the present disclosure, when the format of the received video is not supported by the image-processing procedure executed in the audiovisual system, the format conversion is required to be performed, as shown in FIG. 6, to convert the HDR video 61 to the SDR video 62. Afterwards, the SDR video 62 is processed by the image-processing procedure executed in the audiovisual system, and one more format conversion may be required with respect to the video format supported by the terminal display device at an output end. For example, as shown in FIG. 7, the SDR video is converted to the HDR video.

FIG. 7 is another schematic diagram illustrating various units in the audiovisual system at different stages of video format conversion according to one embodiment of the present disclosure. The diagram shows a process of converting an SDR video 71 to an HDR video 72. Similarly, the units of the audiovisual system at different stages can be implemented by circuits, software or firmware. In the present embodiment, the audiovisual system receives a first format video (i.e., the SDR video 71) in a first color space (i.e., a YUV color space). The SDR video 71 is preferably an ITU BT.709 video that covers a color gamut as shown in a schematic diagram of FIG. 8, in which the ITU BT.709 video has a narrower color gamut. Afterwards, the SDR video 71 can be converted to a second format video (i.e., the HDR video 72) that is an ITU BT. 2020 video with a wider color gamut.

In the audiovisual system, a first color space conversion unit 701 firstly frame-by-frame converts the SDR video 71 from the YUV color space to the RGB color space. One of the conversion procedures can be implemented by, but not limited to, a third conversion formula. In the present example, "[R,G,B]" represents the values of a red channel, a green channel, and a blue channel in the RGB color space, "[Y,U,V]" represents the values of the components in the YUV color space, and "M3" represents a transfer matrix.

The third conversion formula is as follows:

$$[R, G, B]^T = M3[Y, U, V]^T;$$

$$M3 = \begin{bmatrix} 1 & 0 & 1.5748 \\ 1 & -0.1873 & -0.4681 \\ 1 & 1.8556 & 0 \end{bmatrix}.$$

The input video that is converted to the RGB color space is then transferred by the electro-optical transfer unit 702 that can be implemented by EOTF with gamma 2.2 to the visible light signals that are configured to be displayed. Since the SDR video inevitably loses overbright or overdark details of the images, the electro-optical transfer function processes the data of the color channels of the BT.709 video in the RGB color space with a gamma curve correction so that the brightness of the video approaches a gamma 2.2 curve.

Afterwards, a gamut conversion matrix 703 is used to convert the BT.709 video to the BT.2020 video with a wider color gamut, so as to meet the requirement of outputting an HDR video. For example, a 3×3 transfer matrix is used to map the BT.709 video onto the BT.2020 specification so as to comply with the format supported by the terminal display device. The gamut conversion formula is as follows:

$$\begin{bmatrix} E_R \\ E_G \\ E_B \end{bmatrix}_{2020} = \begin{bmatrix} 0.6274 & 0.3293 & 0.0433 \\ 0.0691 & 0.9195 & 0.0114 \\ 0.0164 & 0.0880 & 0.8956 \end{bmatrix} \begin{bmatrix} E_R \\ E_G \\ E_B \end{bmatrix}_{709}.$$

Figure 10:
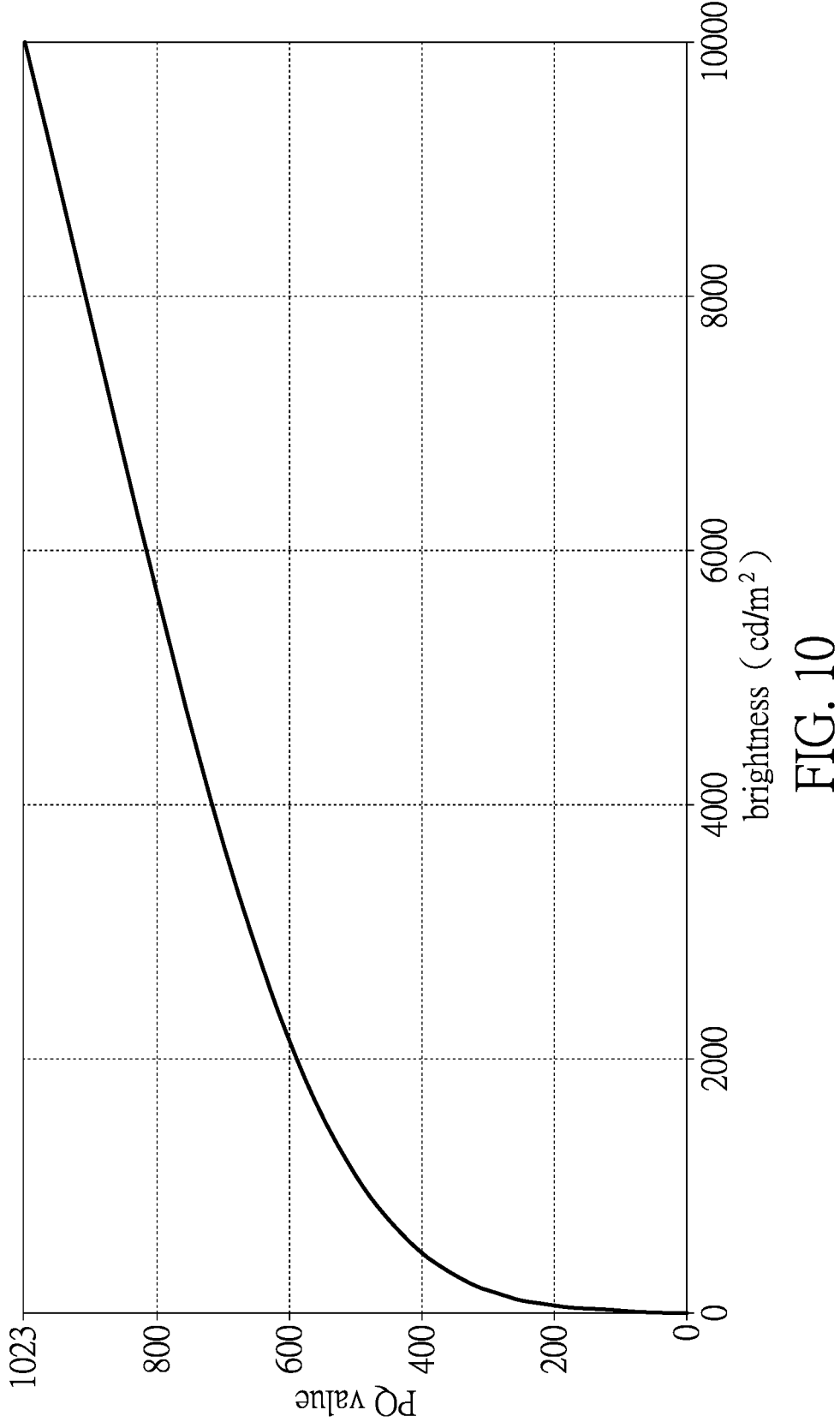
FIG. 10 is a schematic diagram illustrating a perceptual quantization curve adopted in an optical-electro transfer function according to one embodiment of the present disclosure.

When the video is converted to a super high resolution video under the BT.2020 specification, an optical-electro transfer unit 704 that is implemented by OETF, preferably 2084 OETF, is used to transfer the data in each of the color channels of the SDR video in the RGB color space to the HDR video that is suitable to be displayed on the terminal display device. It should be noted that the SDR video can be mapped to the HDR video with the brightness that is suitable to be displayed on the terminal display device through the perceptual quantization curve (PQ curve) as shown in FIG. 10. In FIG. 10, the perceptual quantization value (PQ value) is quantized to 10-bit coding data and the brightness value (cd/m²) may be coded to N-bit data. Finally, the HDR video can be frame-by-frame converted back to the YUV color space by a second color space conversion unit 705. One of the conversion procedures can be implemented by, but not limited to, a fourth conversion formula as shown below. As shown in the present example, a transfer matrix M4 is used to transfer "[R,G,B] (i.e., the values of a red channel, a green channel, and a blue channel in the RGB color space)" to "[Y,U,V] (i.e., the values of the components of YUV color space)".

The fourth conversion formula is as follows:

$$[Y, U, V]^T = M4[R, G, B]^T;$$

$$M4 = \begin{bmatrix} 0.2627 & 0.678 & 0.0593 \\ -0.1396 & -0.3604 & 0.5 \\ 0.5 & -0.4598 & -0.0402 \end{bmatrix}.$$

Finally, the SDR video 71 is converted to the HDR video 72 under the BT.2020 specification through the above-mentioned format conversion procedures.

According to certain embodiments of the present disclosure, the audiovisual system can be implemented by a system-on-chip (SoC), firmware or software, or circuits embedded in a television system, or any video transfer device. The audiovisual system adopts the technologies of video conversions exemplarily described in FIG. 4 to FIG. 7. Furthermore, reference is made to FIG. 11, which is a flowchart describing an overall process of the method for processing a video according to one embodiment of the present disclosure.

The image-processing technologies that are used to enhance the images in the audiovisual system support a specific video format (i.e., a first format). When the system begins to operate, the format of an input video can be detected when the input video is received (step S111). It is determined whether or not the format of the input video is consistent with the first format (step S113). If the input video is a first format video which is consistent with the format supported by the audiovisual system (yes), the input video can directly undergo image-processing procedure (step S117). Afterwards, the video can be outputted in the same format (step S121).

Figure 11:
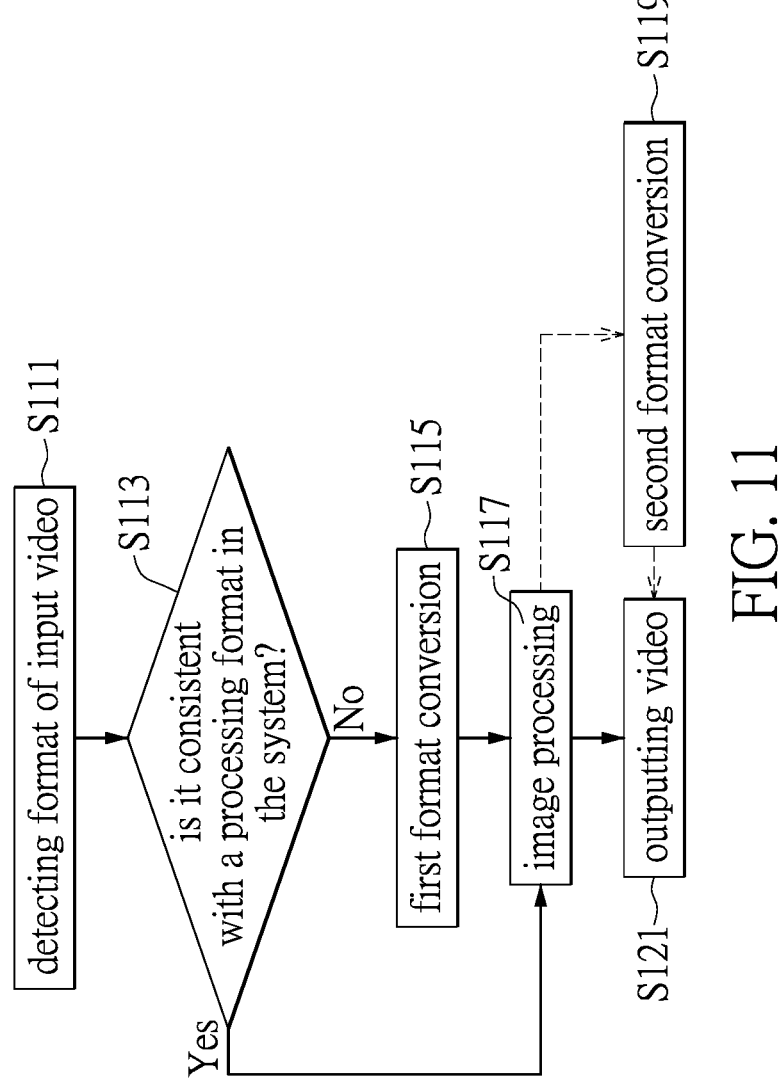
FIG. 11 is a flowchart illustrating a method for processing a video in one embodiment of the present disclosure.

On the contrary, when the format of the video inputted to the audiovisual system is the second format that is different from the format (i.e., the first format) supported by the audiovisual system (i.e., the "no" as shown in FIG. 11), the first format conversion procedure is performed on the input video (step S115) so that the second format video is converted to the first format video. According to the embodiments as described above in FIG. 4 and FIG. 5, a video format conversion is firstly required. The first format conversion procedure can refer to in the embodiment as described in FIG. 6, which shows multiple processing procedures that mainly include first color space conversion, electro-optical transferring, video format conversion, optical-electro transferring, and second color space conversion.

Next, the first format video is processed (step S117), and then the processed first format video is outputted (step S121).

If the terminal display device of the audiovisual system supports the second format video, a second format conversion procedure is necessary to be performed on the first format video after the first format video is processed (step S119). Then, the first format video is converted to the second format video, and the second format video is outputted (step S121).

In the abovementioned embodiments, the format supported by the audiovisual system can be a first format (e.g., SDR), and the input video needs to be converted to the first format video for further image processing if the input video is a second format (e.g., HDR). Finally, based on the video format supported by the terminal display device, the audiovisual system determines whether or not to perform another format conversion. Accordingly, the audiovisual system can use the same image-processing circuitry or software, including the same processing parameters, without any additional image-processing solution for any specific video format being provided.

In conclusion, according to the above embodiments of the audiovisual system with a shared image-processing procedure and the method for processing a video, the audiovisual system can provide a single type of image-processing circuitry or software and be able to process the videos in various formats through format conversion. In particular, even though most of the solutions of image-processing technologies are aimed at the SDR videos in the long-term development of the video formats, these image-processing solutions can also be adapted to the HDR videos through the method provided in the present disclosure. Therefore, the conventional image-processing solutions are still applicable without additional parameter modulations or circuitry costs when developing an audiovisual system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing a video, applied to an audiovisual system, comprising:
   receiving the video, and determining whether format conversion should be performed by identifying whether the video is a first format video or a second format video; and
   performing a first format conversion procedure to convert the second format video into the first format video that is supported by an image-processing procedure performed in the audiovisual system when the video is determined to be the second format video, or directly performing the image-processing procedure on the video when the video is determined to be the first format video, and outputting the first format video that has undergone the image-processing procedure;

wherein, when a terminal display device connected to an output end of the audiovisual system supports the second format video, the first format video that has undergone the image-processing procedure is again converted to the second format video that is configured to be outputted to the terminal display device by performing a second format conversion procedure;
wherein the image-processing procedure that allows the audiovisual system to support processing both the first format video and the second format video comprises steps of:
   statistically analyzing image features of the first format video; and
   performing one or more image-processing processes including noise reduction, image sharpening, saturation adjustment, and contrast and hue adjustment on the first format video.

2. The method according to claim 1, wherein the first format conversion procedure includes:
   frame-by-frame converting the received second format video from a first color space to a second color space;
   performing an electro-optical transfer procedure on the second format video in the second color space for transferring the second format video into visible light signals;
   performing a color gamut conversion for converting the second format video in the second color space to the first format video;
   performing an optical-electro transfer procedure on the first format video in the second color space for gamma correction; and
   frame-by-frame converting the first format video that has undergone the gamma correction from the second color space to the first color space, and outputting the first format video in the first color space to the image-processing procedure.

3. The method according to claim 1, wherein processing parameters applied to the image-processing procedure performed in the audiovisual system are modulated for the first format video so as to optimize the video outputted to the terminal display device.

4. The method according to claim 3, wherein the first format conversion procedure includes:
   frame-by-frame converting the received second format video from a first color space to a second color space;
   performing an electro-optical transfer procedure on the second format video in the second color space for transferring the second format video into visible light signals;
   performing a color gamut conversion for converting the second format video in the second color space to the first format video;
   performing an optical-electro transfer procedure on the first format video in the second color space for gamma correction; and
   frame-by-frame converting the first format video that has undergone the gamma correction from the second color space to the first color space, and outputting the first format video in the first color space to the image-processing procedure.

5. The method according to claim 1, wherein the first format video supported by the image-processing procedure performed in the audiovisual system is a standard dynamic range video, and the second format video is a high dynamic range video.

6. The method according to claim 5, wherein the first format conversion procedure includes:

frame-by-frame converting the received second format video from a first color space to a second color space;

performing an electro-optical transfer procedure on the second format video in the second color space for transferring the second format video into visible light signals;

performing a color gamut conversion for converting the second format video in the second color space to the first format video;

performing an optical-electro transfer procedure on the first format video in the second color space for gamma correction; and frame-by-frame converting the first format video that has undergone the gamma correction from the second color space to the first color space, and outputting the first format video in the first color space to the image-processing procedure.

7. The method according to claim 6, wherein the first color space is a YUV color space and the second color space is an RGB color space.

8. An audiovisual system, comprising:

an image-processing circuit, which is configured to perform a method for processing a video comprising steps of:

receiving the video, and determining whether format conversion should be performed by identifying whether the video is a first format video or a second format video; and performing a first format conversion procedure to convert the second format video into the first format video that is supported by an image-processing procedure performed in the audiovisual system when the video is determined to be the second format video, or directly performing the image-processing procedure on the video when the video is determined to be the first format video, and outputting the first format video that has undergone the image-processing procedure;

wherein, when a terminal display device connected to an output end of the audiovisual system supports the second format video, the first format video that has undergone the image-processing procedure is again converted to the second format video that is configured to be outputted to the terminal display device by performing a second format conversion procedure;

wherein the image-processing procedure that allows the audiovisual system to support processing both the first format video and the second format video comprises steps of:

statistically analyzing image features of the first format video; and performing one or more image-processing processes including noise reduction, image sharpening, saturation adjustment, and contrast and hue adjustment on the first format video.

9. The audiovisual system according to claim 8, wherein the first format conversion procedure performed by the image-processing circuit comprises:

frame-by-frame converting the received second format video from a first color space to a second color space;

performing an electro-optical transfer procedure on the second format video in the second color space for transferring the second format video into visible light signals;

performing a color gamut conversion for converting the second format video in the second color space to the first format video;

performing an optical-electro transfer procedure on the first format video in the second color space for gamma correction; and frame-by-frame converting the first format video that has undergone the gamma correction from the second color space to the first color space, and outputting the first format video in the first color space to the image-processing procedure.

10. The audiovisual system according to claim 8, wherein processing parameters applied to the image-processing procedure performed in the audiovisual system are modulated for the first format video so as to optimize the video outputted to the terminal display device.

11. The audiovisual system according to claim 10, wherein the first format conversion procedure performed by the image-processing circuit comprises:

frame-by-frame converting the received second format video from a first color space to a second color space;

performing an electro-optical transfer procedure on the second format video in the second color space for transferring the second format video into visible light signals;

performing a color gamut conversion for converting the second format video in the second color space to the first format video;

performing an optical-electro transfer procedure on the first format video in the second color space for gamma correction; and frame-by-frame converting the first format video that has undergone the gamma correction from the second color space to the first color space, and outputting the first format video in the first color space to the image-processing procedure.

12. The audiovisual system according to claim 8, wherein the first format video supported by the image-processing procedure performed in the audiovisual system is a standard dynamic range video, and the second format video is a high dynamic range video.

13. The audiovisual system according to claim 8, wherein the audiovisual system is disposed in an image-processing device and allows videos of multiple video formats to share the image-processing procedure; and the image-processing device performs the first format conversion procedure and the image-processing procedure on the second format video so as to output the first format video.

14. The audiovisual system according to claim 13, wherein the first format conversion procedure performed by the image-processing circuit comprises:

frame-by-frame converting the received second format video from a first color space to a second color space;

performing an electro-optical transfer procedure on the second format video in the second color space for transferring the second format video into visible light signals;

performing a color gamut conversion for converting the second format video in the second color space to the first format video;

performing an optical-electro transfer procedure on the first format video in the second color space for gamma correction; and frame-by-frame converting the first format video that has undergone the gamma correction from the second color space to the first color space, and outputting the first format video in the first color space to the image-processing procedure.

* * * * *